United States Patent
Menn

[15] 3,666,929
[45] May 30, 1972

[54] FLIGHT CONTROL SYSTEM FOR FOLLOWING MULTI-STAGE DESCENT PROFILE

[72] Inventor: Bruce E. Menn, Woodland Hills, Calif.
[73] Assignee: Lear Siegler, Inc., Santa Monica, Calif.
[22] Filed: Sept. 2, 1969
[21] Appl. No.: 854,376

[52] U.S. Cl. ...............235/150.22, 235/150.26, 244/77 A, 343/5 GC, 343/6 DF, 343/7 A
[51] Int. Cl. ......................................................G06f 15/50
[58] Field of Search.............................244/77 A, 3.15, 3.2; 235/150.22, 150.26, 61.5; 343/5 GC, 7 A, 6 DF

[56] References Cited

UNITED STATES PATENTS

| 3,081,969 | 3/1963 | Farris et al. | 244/77 A |
| 3,169,730 | 2/1965 | Gaylor et al. | 244/77 A |
| 3,265,333 | 8/1966 | Montooth | 244/77 A |

OTHER PUBLICATIONS

Milojedic, P. Cubic Figures. In Computers and Automation. 15(8): p. 10, August, 1966. TJ212.C5.

Primary Examiner—Eugene G. Botz
Assistant Examiner—R. Stephen Dildine, Jr.
Attorney—Harold L. Jackson, Stanley R. Jones, Robert M. Vargo and Eric T. S. Chung

[57] ABSTRACT

A flight control system for commanding an aircraft to fly a smoothly curved descent path during transition from a first linear descent path to a second linear descent path. The control system produces desired altitude information to define an approximation to the curved descent path. The aircraft's horizontal axis is controlled during transition using desired horizontal speed information dependent upon the instantaneous slope of the curved transition path.

25 Claims, 6 Drawing Figures

Patented May 30, 1972

INVENTOR.
BRUCE E. MENN

BY

Christie, Parker & Hale
ATTORNEYS

FLIGHT CONTROL SYSTEM FOR FOLLOWING MULTI-STAGE DESCENT PROFILE

BACKGROUND OF THE INVENTION

1. Field of the Invention

This invention relates to flight control systems for aircraft, and more particularly to a system for commanding an aircraft to smoothly fly a multi-stage descent profile at safe, gradually changing speeds.

2. Description of the Prior Art

The recent increase in air traffic congestion has emphasized the need for systems capable of accurately guiding aircraft to the terminal area. The use of aircraft capable of flying a wide envelope of multi-stage descents increases the air traffic that can be accommodated in the terminal area. The need for a control system capable of commanding such aircraft to accurately fly multi-stage descent profiles is apparent. In addition, to increasing the air traffic accommodated in the terminal area, precise vertical-plane control improves fuel economy and noise abatement.

SUMMARY OF THE INVENTION

In terms of method, this invention contemplates deriving an approximation to a smoothly curved transition path extending from an initial point of origin on a first linear path to a second linear path intersecting the first path. The invention includes the steps of generating physical representations of a series of spaced-apart reference points located on the second linear path and generating physical representations of an initial linear transition path extending from the initial point of origin to an initial one of the reference points. The approximation to the curved transition path is then derived by generating physical representations of successive linear transition paths each extending from a respective point of origin on the preceding linear transition path to the succeeding reference point on the second linear path. The slopes of the successive transition paths progressively approach the slope of the second path, and the successive points of origin cooperate to define an approximation of a smoothly curved transition path extending from the initial point of origin to the second linear path.

Preferably, the successive reference points are displaced from one another by a small finite displacement $\Delta X$. Further, the successive points of origin are preferably displaced from one another by the distance $\Delta X$. Thus, at each incremental displacement $\Delta X$ from the initial point of origin along a straight line, a new point of origin is established on the preceding linear transition point.

In terms of apparatus, this invention provides a control syste4 for commanding an aircraft to fly a smoothly curved descent path during a transition between linear descent paths of a multi-stage descent profile. The control system further provides desired speed information for commanding the aircraft to fly at safe, gradually changing speeds during transition.

Briefly, the control system of this invention produces a position signal representative of incremental advancements in the aircraft's actual position during the aircraft's transition from the first descent path to the second descent path. For each incremental advancement of the aircraft, the control system produces a corresponding command signal representative of the aircraft's desired position. The command signal defines consecutive segmental linear descent paths extending away from a point on the first descent path and approaching the second descent path as the aircraft descends toward the second descent path. The slopes of the successive segmental descent paths progressively approach the slope of the second descent path during the aircraft's descent to define a smoothly curved descent path asymptotically approaching the second descent path. Alternatively, the command signal can define successive aircraft angles of descent progressively approaching the angle of descent of the second linear descent path. Utilization means responsive to the command signal control the aircraft during its descent.

In a preferred form of the invention, the position signal represents the aircraft's actual horizontal displacement from a vertical reference path, and the command signal represents the desired altitude of the aircraft above a horizontal reference path. However, the position signal can represent the aircraft's actual altitude and the command signal can represent the aircraft's desired horizontal displacement relative to a particular reference path.

Preferably, the approximation to the curved descent path is derived by generating signals representative of a large number of linear transition paths, each successive transition path having an angle of descent approaching that of the second descent path. When the aircraft reaches an initial point of origin on the first descent path, the smoothing between descent paths is initiated. Signals are generated defining the position of an initial linear transition path extending from the initial point of origin to an initial reference point on the second descent path. In a preferred form of the invention, the initial reference point is displaced from the point of intersection of the first and second descent paths by a small horizontal distance $\Delta X$. When the aircraft's horizontal position becomes displaced from the initial point of origin by a selected horizontal distance, preferably $\Delta X$, a new point of origin on the preceding transition path is established. Signals are then generated to define a new linear transition path extending from the new point of origin to a succeeding reference point on the second descent path. Preferably, the succeeding reference point is displaced from the preceding reference point by the distance $\Delta X$.

In a similar manner, the control system produces signals representative of successive linear transition paths, each transition path extending from a respective point of origin on a preceding transition path to a succeeding reference point on the second descent path. The slope of each successive transition path progressively approaches that of the second descent path during the aircraft's descent so that respective points of origin define an approximation to a curved descent path asymptotically approaching the second descent path. The command signal represents the vertical displacement of the respective points of origin relative to a horizontal reference path, with each measurement of vertical displacement representing the desired altitude of the aircraft during its descent. Airborne instrumentation can be used to determine the aircraft's actual altitude during the transition between descent paths. The control system is then adapted to determine the aircraft's altitude error during transition by comparing actual altitude with desired altitude. The altitude error signal is then coupled to utilization means such as an automatic flight control system so that the aircraft automatically maintains a smooth transition from the first descent path to the second descent path.

This invention further contemplates commanding safe speeds during the aircraft's flight along the curved descent path. Preferably, proportionately lower airspeeds are commanded as the aircraft's angle of descent becomes steeper, and vice versa. Thus, the control system of this invention produces a desired vector speed signal having a magnitude inversely proportional to the slope of the aircraft's instantaneous descent path. Desired horizontal and vertical speed terms are components of the desired vector speed, and these terms vary smoothly as the aircraft's descent angle changes.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENT

Figure 1:
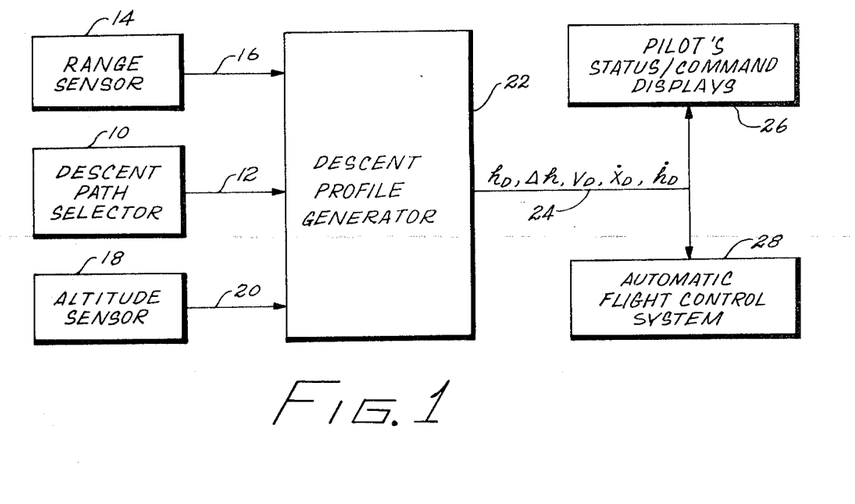
FIG. 1 is a block diagram showing the basic operation of the control system of this invention.

Referring to the drawings, FIG. 1 shows a preferred system for deriving information required to guide an aircraft smoothly and safely along a multi-stage descent profile. A pilot-operated descent path selector 10 produces output signals 12 representing the location and angle of each linear descent path of the desired multi-stage descent profile. A range sensor 14 produces an output signal 16 representing the aircraft's instantaneous range to a preselected target point. An altitude sensor 18, preferably a radar altimeter produces an output signal 20 representing the aircraft's instantaneous altitude. Output signals 12, 16 and 20, are fed to a descent profile generator 22 which produces output signals 24 providing the flight information necessary to maintain a smooth descent profile. Such information preferably includes the aircraft's desired altitude $h_D$, altitude error $\Delta h$, desired vector speed $V_D$ for maintaining safe speeds along the desired descent profile, and the respective horizontal and vertical vector components $\dot{X}_D$ and $\dot{h}_D$ of the desired vector speed. Output signals 24 are fed to utilization means such as the pilot's status/command displays 26 for use in manually flying the aircraft along the desired descent profile. Output signals 24 are further coupled to alternate utilization means such as an automatic flight control system 28 for automatically flying the aircraft along the descent profile.

Figure 2:
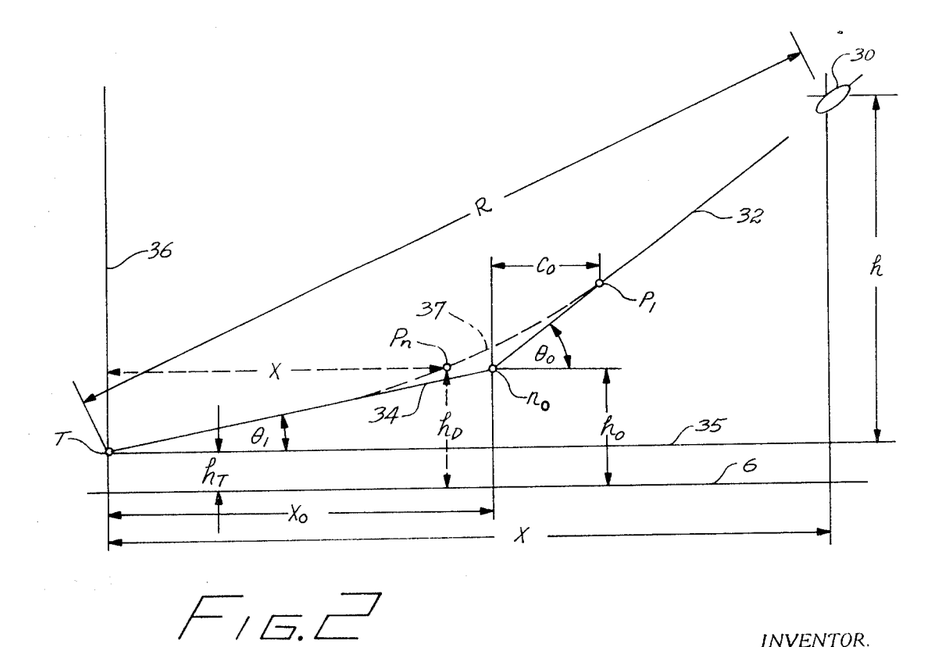
FIG. 2 is a diagrammatic representation of a smoothly curved transition path between a two-stage vertical descent profile.

FIG. 2 shows an aircraft 30 during flight prior to capturing a two-stage descent profile which includes a first linear descent path 32 and a second linear descent path 34. The second descent path 34 terminates at a target point T at the landing site toward which the aircraft is flying. FIG. 2 shows target point T located at an altitude $h_T$ above ground G. Alternatively, target point T can be at a desired touchdown point on the ground. Preferably, output signal 20 from altitude sensor 18 represents the aircraft's altitude above ground G. Descent profile generator 22 includes means (not shown) responsive to altitude signal 20 for producing an instantaneous measurement of the aircraft's altitude $h$ above a horizontal reference path 35 whose location is defined by target point T. Output signal 16 from range sensor 14 produces instantaneous measurements of the aircraft's slant range R from target point T. Range signals 16 and altitude signal 20 are fed to descent profile generator 22 which provides an instantaneous measurement of the aircraft's horizontal displacement X from a vertical reference path 36 whose location is defined by target point T. Horizontal displacement X is determined in accordance with the relationship $X = \sqrt{R^2 - h^2}$.

Output signals 12 from descent path selector 10 include pilot selected descent path information such as an angle $\theta_0$ representing the slope of linear descent path 32, a magnitude $X_0$ representing the horizontal displacement of a point of intersection $n_0$ of descent paths 32 and 34, and a magnitude $C_0$ representing the horizontal displacement from intersection point $n_0$ of an initial point of origin $P_1$ on descent path 32. Initial point of origin $P_1$ defines the origin of a curved transition path 37 extending from descent path 32 to descent path 34. As seen best in FIG. 2, curved transition path 37 provides a smooth transition from descent path 32 to descent path 34. Aircraft 30 flies on curved transition path 37 using desired altitude $h_D$ and/or altitude error $\Delta h$ information produced by vertical profile generator 22. For example, when the aircraft's instantaneous horizontal displacement from vertical reference path 36 is $X_n$, the aircraft's corresponding desired altitude above horizontal reference path 35 is $h_D$, the distances $X_n$ and $h_D$ defining a point $P_n$ on curved descent path 37. Thus the control system of this invention commands the aircraft to fly at an altitude $h_D$ upon reaching horizontal position $X_n$, so that the aircraft's descent path during transition passes through point $P_n$.

Figure 3:
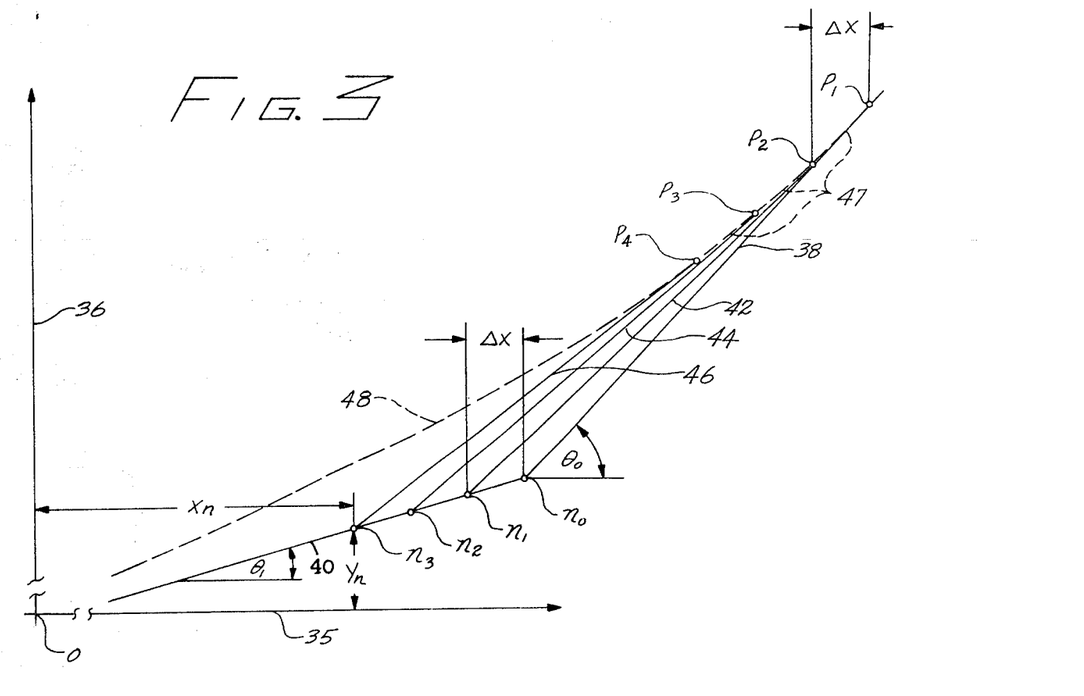
FIG. 3 is a detailed diagrammatic representation illustrating the method for deriving the smooth transition path shown in FIG. 2.

A preferred method of approximating curved transition path 37 is shown in FIG. 3 wherein a first linear path 38 representative of descent path 32 intersects a second linear path 40 representative of second descent path 34. Linear path 38 has a slope or an angle of descent represented by angle $\theta_0$, and linear path 40 has a slope or an angle of descent represented by angle $\theta_1$. Paths 38 and 40 intersect at a point of intersection $n_0$.

The approximation of curved transition path 37 begins at initial point of origin $P_1$ on linear path 38. The relative location of initial point of origin $P_1$ and other parameters is determined with reference to a rectangular coordinate system defined by horizontal reference path 35 and vertical reference path 36 intersecting at an origin 0. Initial point of origin $P_1$ defines the origin of an initial linear transition path 42 which extends to an initial reference point $n_1$ on second linear path 40. The horizontal displacement $X$ of point $n_1$ from reference path 36 is $\Delta X$ less than that of point $n_0$, where $\Delta X$ is a small horizontal distance.

After linear transition path 42 is derived, a second linear transition path 44 is generated between a second point of origin $P_2$ on initial linear transition path 42 and a second reference point $n_2$ on linear path 40. The horizontal displacement of second point of origin $P_2$ relative to vertical reference path 35 is $\Delta X$ less than that of initial point of origin $P_1$. The horizontal displacement of second reference point $n_2$ is $\Delta X$ less than that of initial reference point $n_1$.

At a horizontal displacement $\Delta X$ less than that of second point of origin $P_2$, a third point of origin $P_3$ is established on second linear transition path 44. Point of origin $P_3$ defines a third linear transition path 46 which extends to a third reference point $n_3$ on linear path 40. Reference point $n_3$ is displaced from second reference point $n_2$ by the distance $\Delta X$.

Next, a fourth point of origin $P_4$ is established on third linear transition path 46 at a horizontal displacement $\Delta X$ less than that of third point of origin $P_3$, and point of origin $P_4$ defines a new linear transition path (not shown). The method thus far described is continued by repeatedly establishing a new point of origin and a corresponding linear transition path at each decreasing increment $\Delta X$ in horizontal displacement relative to vertical reference path 36. The resulting points of origin define consecutive segmental linear descent paths 47, each path having a particular angle of descent. Descent paths 47 cooperate to provide an approximation to a curved transition path 48 which originates at initial point of origin $P_1$ and becomes asymptotic to linear path 40, as shown in FIG. 3.

The method of FIG. 3 is implemented in a control system for aircraft using the following steps:

STEP 1. Initially determine the location of linear descent paths 38 and 40 (FIG. 3) by establishing the magnitudes of descent angle $\theta_0$ and $\theta_1$, and the horizontal displacement $X_0$ and vertical displacement $h_0$ of intersection point $n_0$ (FIG. 2) relative to vertical and horizontal reference paths 36 and 35 respectively.

STEP 2. Establish the magnitude of incremental horizontal displacement $\Delta X$.

STEP 3. Determine the instantaneous horizontal position $X$ of the aircraft relative to vertical reference path 36 from the relationship $X = \sqrt{R^2 - h^2}$.

STEP 4. Assuming that flight is initially established along linear descent path 32, and that the aircraft's horizontal displacement relative to vertical reference path 36 is greater than that of initial point of origin $P_1$, i.e., $X > X_0 + C_0$, determine the desired altitude command $h_D$ necessary to maintain the aircraft on descent path 32 from the relationship $h_D = (X - X_0) \tan\theta_0 + h_0$.

STEP 5. Determine the slope $m$ of descent path 32 from the relationship $m = \tan\theta_0$.

STEP 6. From the instantaneous measurement of actual aircraft altitude $h$, determine the altitude error $\Delta h$ in accordance with the relationship $\Delta h = h - h_D$.

STEP 7. Determine the desired vector speed $V_D$ of the aircraft from the relationship $V_D = K/m$.

STEP 8. Determine the aircraft's desired horizontal speed $\dot{X}_D$ from the relationship $$\dot{X}_D = V_D \frac{1}{\sqrt{1 + m^2}}.$$

STEP 9. Using an instantaneous measurement of the aircraft's actual horizontal speed $\dot{X}$, determine the aircraft's desired speed $\dot{h}_D$ from the relationship $\dot{h}_D = m\dot{X}$.

STEP 10. When the aircraft's horizontal displacement $X$ is that of initial point of origin $P_1$, generate curved transition path 37. Initial point of origin $P_1$ is reached when the aircraft's horizontal displacement $X$ relative to vertical reference path 36 is $X_0 + C_0$. At that point, the aircraft's desired altitude $h_D$ is determined from the relationship $h_D = C_0 \tan\theta_0 + h_0$.

STEP 11. When the aircraft's horizontal displacement becomes $\Delta X$ less than that of initial point of origin $P_1$, as seen in FIG. 3, determine the next point of origin $P_2$. The horizontal displacement $X_{(pre)}$ of the aircraft at the previous determination of $h_D$ is compared with the aircraft's instantaneous displacement $X$ to determine when $X$ changes by a magnitude $\Delta X$. During the aircraft's flight toward linear descent path 34, a new value of $h_D$ is established each time the aircraft's displacement $X$ becomes $X_{(pre)} - \Delta X$.

STEP 12. Using the method described in FIG. 3, derive successive values of desired altitude $h_D$ by generating a series of linear transition paths. Each transition path extends from a preceding point of origin on a preceding linear transition path to a new reference point. Each succeeding reference point on descent path 34 is displaced from the preceding reference point by the magnitude $\Delta X$. Therefore, the horizontal displacement $X_n$ of each reference point is $X_{n(pre)} - \Delta X$, where $X_{n(pre)}$ is the horizontal displacement of the previously established reference point relative to vertical reference path 36. In similar fashion, the vertical displacement $Y_n$ relative to horizontal reference path 35 of each successive reference point is $Y_{n(pre)} - \Delta X \tan\theta_1$, where $Y_{n(pre)}$ is the vertical displacement of the previously established reference point.

STEP 13. Assuming that the respective horizontal and vertical coordinates of the point of origin $(X_{(pre)}, h_D)$ and reference point $(X_n, Y_n)$ of a particular linear transition path are established, determine the slope $m$ of the transition path from the relationship $$m = \frac{h_D - Y_n}{X_{(pre)} - X_n}.$$

STEP 14. When the aircraft's horizontal displacement $X$ becomes $\Delta X$ less than $X_{(pre)}$, determine the vertical displacement of the new point of origin, and therefore the aircraft's new desired altitude $h_D$, from the relationship $h_D = m(X - X_n) + Y_n$.

The new point of origin lies on the previous transition path and defines the origin of a new linear transition path.

STEP 15. Determine the respective flight parameters $\Delta h$, $V_D$, $\dot{X}_D$, and $\dot{h}_D$ in accordance with the equations shown in STEPS 6, 7, 8, and 9 above.

Figure 4A:
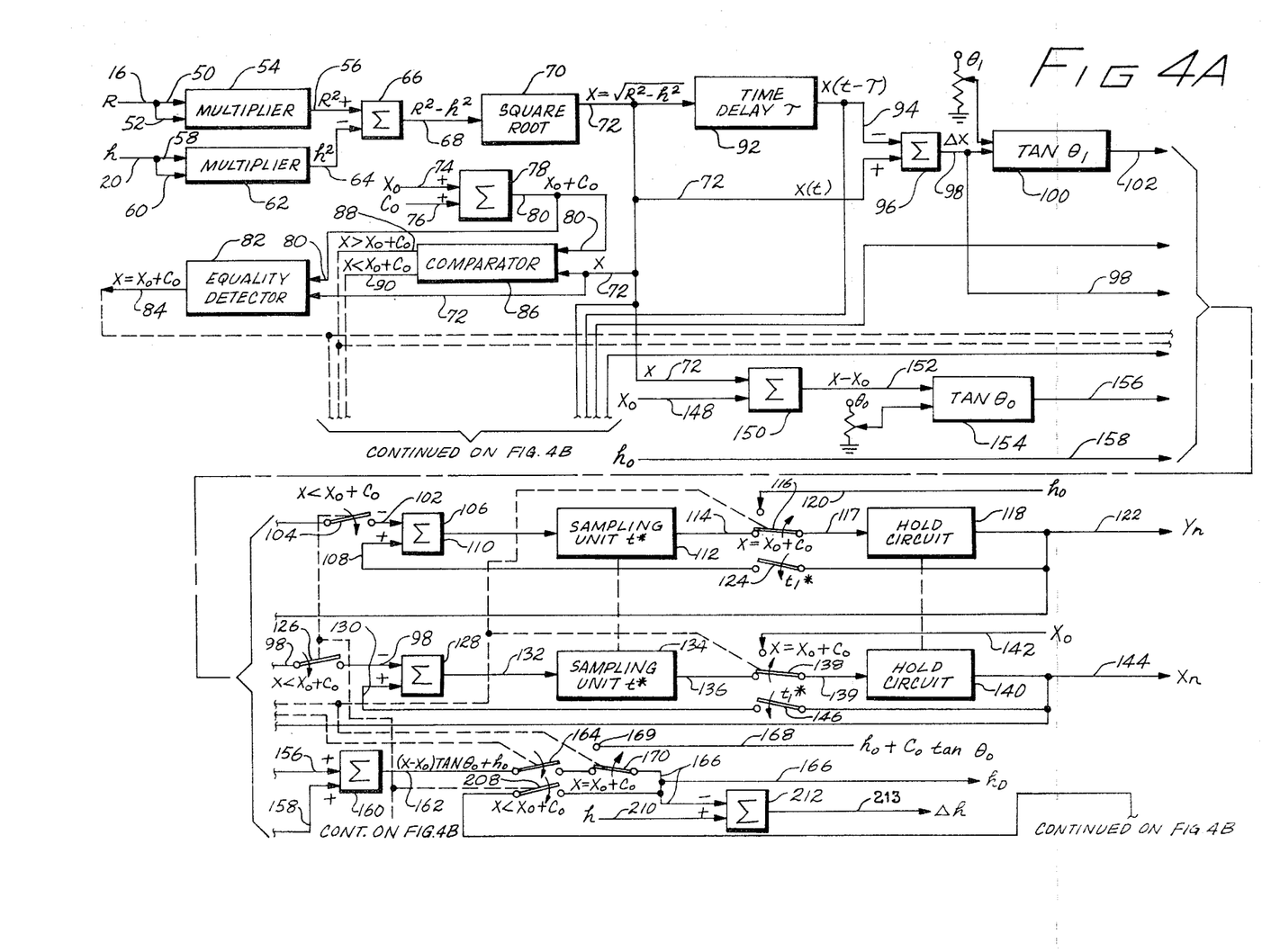
FIGS. 4A and 4B show a block diagram illustrating the operation of a preferred system of the function generators used to derive the transition curve of this invention.
Figure 4B:
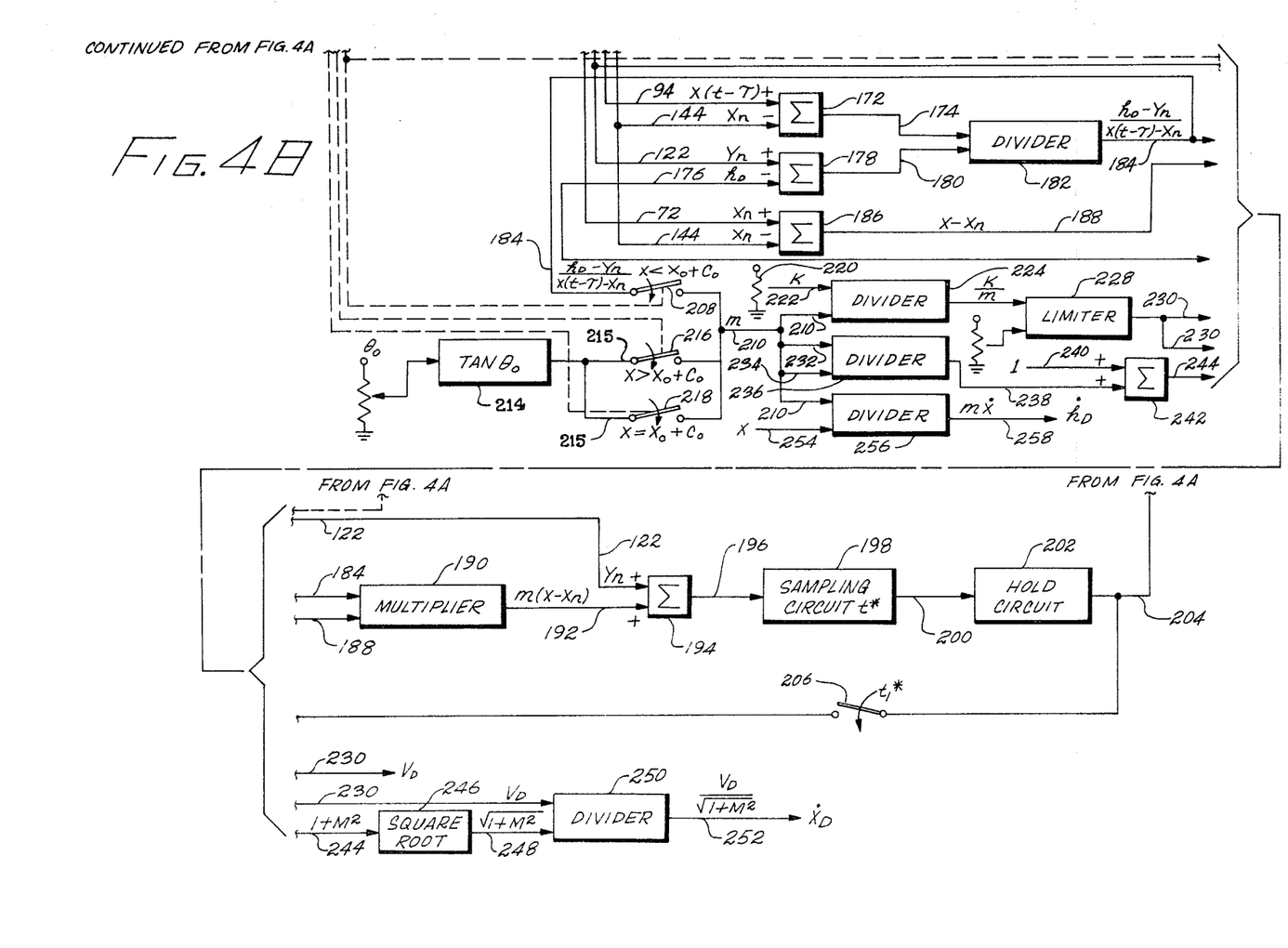

FIGS. 4A and 4B show the preferred system for generating the flight parameters required to maintain flight along the desired descent profile.

DERIVATION OF $X$

Range signal 16 is applied to inputs 50 and 52 of a multiplier 54 for producing an output signal 56 having a magnitude $R^2$ proportional to the product of the signals applied to inputs 50 and 52. Altitude signal 20 is applied to inputs 58 and 60 of a multiplier 62 for producing an output signal 64 having a magnitude $h^2$ proportional to the product of the signals applied to inputs 58 and 60. Signals 56 and 64 are fed to a summing device 66 which produces an output signal 68 having a magnitude $R^2 - h^2$ proportional to the algebraic difference between signals 56 and 64. Output signal 68 is applied to a square root function generator 70 which produces an output signal 72 having a magnitude $X$ proportional to the square root of signal 68.

SWITCHING LOGIC DERIVATION

A signal 74 having a magnitude $X_0$ and a signal 76 having a magnitude $C_0$ are applied to a summing device 78 which produces an output signal 80 having a magnitude $X_0 + C_0$ proportional to the sum of input signals 74 and 76. Signals 72 and 80 are applied to an equality detector 82 for producing an output signal 84 when the magnitude of signal 72 is identical to that of signal 80, i.e., when $X = X_0 + C_0$. Signals 80 and 72 are further applied to a comparator 86 which produces either an output signal 88 when the magnitude of signal 80 is less than that of signal 72, or an output signal 90 when the magnitude of signal 80 is greater than that of signal 72. Output signals 84, 88, and 90 are used to energize relays (not shown) for closing switches coupled to various circuits (hereinafter described) depending upon the particular magnitude of signal 72.

DERIVATION OF $\Delta X$

Output signal 72, which represents the instantaneous magnitude of $X$ at time $t$, is applied to a time-delay circuit 92 for producing an output signal 94 which represents the instantaneous magnitude of $X$ at a small time interval $\tau$ preceding time $t$. Signals 72 and 94 are applied to a summing device 96 which produces an output signal 98 having a magnitude $\Delta X$ proportional to the algebraic difference between signals 72 and 94. Signal 98 represents the small horizontal displacement traversed during time interval $\tau$.

DERIVATION OF $Y_n$

Signal 98 is applied to a tangent function generator 100 which produces an output signal 102 proportional to the product of signal 98 and the tangent of an angle $\theta_1$. A switch 104 allows signal 102 to pass directly to a summing device 106 when closed. Comparator output signal 90 is coupled to switch 104, and switch 104 is closed when signal 90 is generated, i.e., when $X < X_0 + C_0$. A feedback signal 108 is also applied to summing device 106 which produces an output signal 110 proportional to the algebraic difference between signals 108 and 102. Feedback signal 108 has an instantaneous magnitude $Y_n$, and output signal 110 represents a systematic reduction in signal 108 by a factor $\Delta X \tan\theta_1$. Signal 110 is applied to a sampling circuit 112 which includes a periodically operated switch (not shown) closed at sampling time $t^*$ to sample signal 110. Sampling times $t^*$ occur at time intervals $\tau$, and sampling circuit 112 produces an output signal 114 representing a periodic reduction of feedback signal 108. A switch 116 controls the passage of signals to an input 117 of a hold circuit 118. When the position of switch 116 is that shown in FIG. 4A, signal 114 is passed directly to hold circuit 118. Equality detector output signal 84 is coupled to switch 116 which switches to an alternate position shown in FIG. 4A when signal 84 is produced. When switch 116 is in its alternate position, a signal 120 having a magnitude $h$ is applied to input 117 of hold circuit 118. The hold circuit samples input signal 117 and holds an output signal 122 having a magnitude $Y_n$ which periodically changes at each sampling time $t^*$. Output signal 122 is routed to summing device 106 as feedback signal 108, with a switch 124 in the feedback loop being closed for each hold interval $t_1^*$. Hold circuit 116 maintains output signal 122 and feedback signal 108 at the value of $Y_n$ until sampling circuit 112 reduces $Y_n$ by the factor $\Delta X \tan\theta_1$ at the next sampling time $t^*$.

DERIVATION OF $X_n$

A switch 126 allows signal 98 to pass directly to a summing device 128 when closed. Comparator output signal 90 is coupled to switch 126, and switch 126 is closed when output signal 90 is generated, i.e., when $X<X_0 + C_0$. A feedback signal 130 is also applied to summing device 128 for producing an output signal 132 proportional to the algebraic difference between signals 130 and 98. Feedback signal 130 has an instantaneous magnitude $X_n$, and output signal 132 represents a systematic reduction in signal 130 by the factor $\Delta X$. Signal 132 is applied to a sampling circuit 134 which includes a periodically operated switch (not shown) closed at sampling times $t^*$ to sample signal 132. Sampling times $t^*$ occur at time intervals $\tau$, and sampling circuit 134 produces an output signal 136 representing a periodic reduction of feedback signal 130. A switch 138 controls the passage of signals to an input 139 of a hold circuit 140. When the position of switch 138 is that shown in FIG. 4A, signal 136 is passed directly to input 139 of hold circuit 140. Equality detector output signal 84 is coupled to switch 138 which switches to an alternate position shown in FIG. 4A when signal 84 is produced. When switch 138 is in its alternate position, a signal 142 having a magnitude $X_0$ is applied to input 139 of hold circuit 140. Hold circuit 140 samples its respective input signals and holds an output signal 144 having a magnitude $X_n$ which periodically changes at each sampling time $t^*$. Output signal 144 is routed to summing device 128 as feedback signal 130, with a switch 146 in the feedback loop being closed for each respective hold interval $t_1^*$. Hold circuit 140 maintains output signal 144 and feedback signal 130 at the value $X_n$ until sampling circuit 134 reduces $X_n$ by the factor $\Delta X$ at the next sampling time $t^*$. Sampling circuits 112 and 134 and hold circuits 118 and 140 are operated in response to the same sampling generator (not shown) so that $Y_n$ and $X_n$ are sampled at identical sampling times $t^*$ and held for identical hold intervals $t_1^*$.

DERIVATION OF $h_D$, $\Delta h$, AND $m$

Signal 72 and a signal 148 having a magnitude $X_0$ are applied to a summing device 150 which produces an output signal 152 having a magnitude $X - X_0$ representing the algebraic difference between signals 72 and 148. Signal 152 is applied to a tangent function generator 154 which produces an output signal 156 having a magnitude proportional to the product of signal 152 and the tangent of an angle $\theta_0$. Signal 156 and a signal 158 having a magnitude $h_0$ are fed to a summing device 160 which produces an output signal 162 having a magnitude $(X - X_0)\tan\theta_0 + h_0$ representing the algebraic sum of signals 156 and 158. When comparator output signal 88 is generated, i.e., $X>X_0 + C_0$, a switch 164 is closed, to produce an output signal 166 having a magnitude $h_D = (X - X_0)\tan\theta_0 + h_0$. A signal 168 having a magnitude $h_0 + C_0 \tan\theta_0$ is passed to a terminal 169 of a two-way switch 170. Equality detector output signal 84 is coupled to switch 170, and when signal 84 is produced, switch 170 switches from the position shown in FIG. 4A to an alternate position at terminal 169 to produce output signal 166 having a magnitude $h_D = h_0 + C_0 \tan\theta_0$.

Signals 94 and 144 are applied to a summing device 172 which produces an output signal 174 having a magnitude $X(t-\tau)-X_n$ representing the algebraic difference between signals 94 and 144. Signal 122 and a feedback signal 176 having a magnitude $h_D$ are fed to a summing device 178 which produces an output signal 180 having a magnitude $h_D - Y_n$ representing the algebraic difference between signals 176 and 122. Output signals 174 and 180 are applied to a divider 182 which produces an output signal 184 having a magnitude $$\frac{h_D - Y_n}{X(t-\tau) - X_n}$$

representing the ratio of signal 180 to signal 174. Signals 72 and 144 are applied to a summing device 186 which produces an output signal 188 having a magnitude $X - X_n$ representing the algebraic difference between signals 72 and 144. Output signals 184 and 188 are applied to a multiplier 190 which produces signal 192 having a magnitude $m(X - X_n)$ representing the product of signals 184 and 188. Signals 192 and 122 are applied to a summing device 194 which produces an output signal 196 proportional to the sum of signals 192 and 122. Signal 196 is applied to a sampling circuit 198 which includes a periodically operated switch (not shown) which closes at sampling times $t^*$ to sample signal 196. Sampling times $t^*$ occur at time intervals $\tau$, and sampling circuit output signal 200 represents a magnitude $h_D = m(X - X_n) + Y_n$ which progressively decreases each sampling interval. Signal 200 is applied to a hold circuit 202 which samples signal 200 and holds an output signal 204 having an instantaneous magnitude $m(X - X_n) + Y_n$ which periodically changes at each sampling time $t^*$. Output signal 204 is routed to summing device 178 as feedback signal 176, with a switch 206 in the feedback loop being closed for each hold interval $t_1^*$. Hold circuit 202 maintains output signal 204 at its respective value $m(X - X_n) + Y_n$ until the next sampling time $t^*$. Signal 204 is fed to a switch 208 which is closed when comparator output signal 90 is produced, i.e., $X<X_0 + C_0$. Upon closing of switch 208, output signal 166 becomes $h_D = m(X - X_n) + Y_n$. Signal 166 and a signal 210 having a magnitude $h$ are fed to a summing device 212 which produces an output signal 213 having a magnitude $\Delta h$ representing the algebraic difference between signals 210 and 166.

DERIVATION OF $V_D$, $\dot{X}_D$, AND $\dot{h}_D$

Signal 184 passes to a switch 208 which produces an output signal 210 when comparator output signal 90 is generated, i.e., $X<X_0 + C_0$. A tangent function generator 214 produces an output signal 215 which is proportional to the tangent of an angle $\theta_0$. Signal 215 passes to a switch 216 which produces output signal 210 when comparator output signal 88 is generated, i.e., $X>X_0 + C_0$, and to switch 218 which produces output signal 210 when equality detector output signal 84 is generated, i.e., $X = X_0 + C_0$. A potentiometer 220 is adjusted to produce an output signal 222 having a desired constant magnitude $K$. Signals 222 and 210 are applied to a divider 224 which produces an output signal 226 having a magnitude $K/m$ representing the ratio of signal 222 to signal 210. Signal 226 is passed through an adjustable limiter 228 which limits an output signal 230 therefrom to a predetermined magnitude. Since signal 210 may in some cases be of very small magnitude, limiter 228 is used to limit output signal 230 to magnitudes below a predetermined maximum value.

Signal 210 is applied to a pair of inputs 232 and 234 of a multiplier 236 for producing an output signal 238 having a magnitude $m^2$ proportional to the product of signals 232 and 234. A signal 240 having a magnitude representing unity is applied to a summing device 242 along with signal 238 for producing an output signal 244 having a magnitude $1 + m^2$ proportional to the sum of signals 238 and 240. Signal 244 is applied to a square root function generator 246 which produces an output 248 having a magnitude $\sqrt{1 + m^2}$ proportional to the square root of signal 244. Signals 230 and 248 are applied to a divider 250 which produces an output signal 252 having a magnitude $$\dot{X}_D = \frac{V_D}{\sqrt{1+m^2}}$$

representing the ratio of signal 230 to signal 248.

Signal 210 and a signal 254 having a magnitude $\dot{X}$ are applied to a multiplier 256 which produces an output signal 258 having a magnitude $\dot{h}_D = m\dot{X}$ representing the product of signals 254 and 210.

Figure 5:
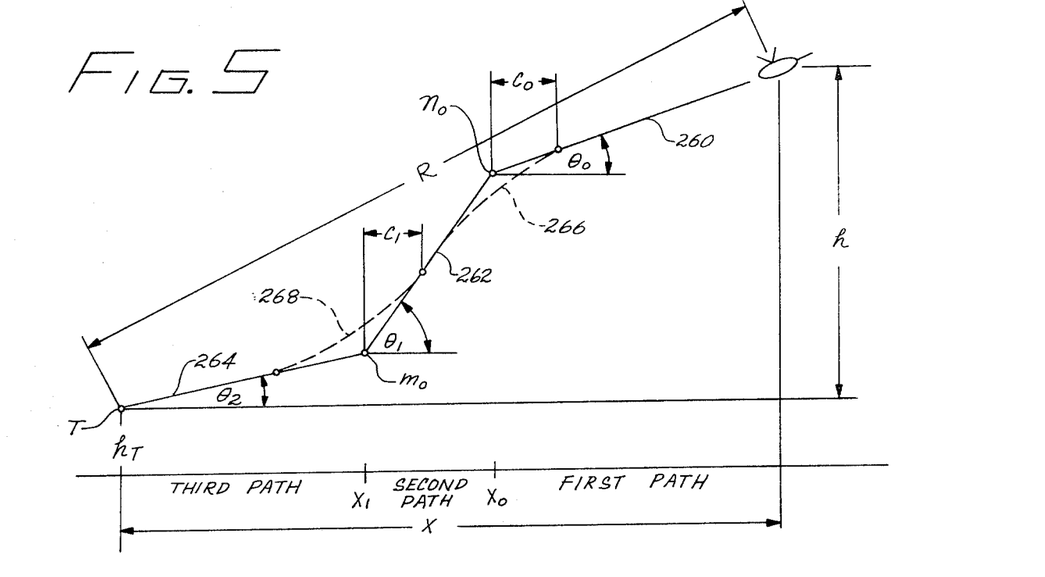
FIG. 5 is a diagrammatic representation of a pair of smoothly curved transition paths along a three-stage vertical descent profile.

FIG. 5 illustrates the use of the method of FIG. 3 for providing smooth transitions along a three-stage descent profile. The descent profile is defined by a first linear descent path 260 having a slope or angle of descent represented by an angle $\theta_0$, a second linear descent path 262 intersecting path 260 at a breakpoint $n_0$ and having a slope or angle of descent represented by the angle $\theta_1$, and a third linear descent path 264 intersecting path 262 at a breakpoint $m_0$ and having a slope or angle of descent represented by the angle $\theta_2$. FIG. 5 illustrates the capability of the control system of this invention in providing a smooth transition between a plurality of linear descent paths. A curved transition path 266 is generated in the proximity of breakpoint $n_0$ using the method described in FIG. 3. Likewise, smoothly curved transition path 268 is generated in the proximity of breakpoint $m_0$. The system described in FIGS. 4A and 4B can be adapted to generate flight parameters required to maintain flight along the descent profile which includes curved transition paths 266 and 268. Such adaptation would require expanding the switching logic circuitry therein to include an additional comparator circuit and an AND-gate to make the determinations $X_1 + C_1 < X < X_0 + C_0$ and $X<X_1 + C_1$ and an additional equality detector to make the determination $X = X_1 + C_1$.

To control the aircraft's speed along the multi-stage descent profile, the control system of this invention derives a periodic measurement of the desired vector speed $V_D$, which is inversely proportional to the slope of the aircraft's corresponding descent angle. As discussed previously, the desired vector speed term permits high speed flight along shallow descent angles and low speed flight along steeper descent angles. The respective vertical and horizontal components $\dot{h}_D$ and $\dot{X}_D$ of the desired vector speed term are used to control the aircraft's vertical and horizontal axes. Transition paths 266 and 268 are derived by generating successive linear descent paths in accordance with the method of FIG. 3. The desired speed term and its vector components are dependent upon the slope of each successive linear descent path, and as a result, the speed terms change frequently while the aircraft transitions between linear descent paths. When the derived control information is coupled to an automatic flight control system, the aircraft automatically proceeds smoothly and at safe speeds along the descent profile to the terminal area.

I claim:

1. A system for controlling the descent of an aircraft from an initial point of origin at a known position on a first substantially linear descent path to a second substantially linear descent path having a slope different from that of the first descent path, the control system comprising means for producing a position signal representative of incremental advancements of the aircraft as it descends from the initial point of origin toward the second descent path; means for producing a command signal representative of a linear descent path; means responsive to the position signal for reducing the slope of the linear descent path represented by the command signal after each incremental advance represented by the position signal so consecutive segmental linear descent paths are formed from the initial point of origin to the second descent path such that the slopes of the respective segmental descent paths progressively approach the slope of the second descent path as the aircraft descends to define an approximation to a smoothly curved descent path extending from the initial point of origin to the second descent path; and utilization means responsive to the command signal for control of the aircraft during its descent.

2. A control system according to claim 1 including means for producing a signal representative of a vertical reference path; and wherein the position signal producing means is responsive to the vertical reference path signal, the position signal being representative of the aircraft's actual horizontal distance from the vertical reference path.

3. A control system according to claim 1 in which the command signal is representative of the desired altitude of the aircraft at each incremental advance in the aircraft's position, the means for producing the command signal including means for determining the slope of a linear descent path extending from a point at the previous desired altitude of the aircraft to the second linear descent path, and means responsive to the slope and the position signal for determining a new desired altitude at a point on the descent path, said point being spaced from the previous desired altitude by said incremental advance in the aircraft's position.

4. A control system according to claim 3 wherein the first signal source includes:
   a. a fifth signal source of indications representative of a terminal point of reference toward which the aircraft is descending;
   b. means responsive to the fifth signal source for producing a signal representative of the aircraft's range from the terminal point of reference;
   c. means responsive to the fourth signal source for producing a signal representative of the aircraft's actual vertical displacement relative to the horizontal reference path; and
   d. means responsive to the range signal and the actual vertical displacement signal for producing an output signal representative of the aircraft's actual horizontal displacement relative to the terminal point of reference.

5. A control system according to claim 1 including means for producing a signal representative of a horizontal reference path, the command signal being representative of the aircraft's desired altitude above the horizontal reference path; and including means for producing a signal representative of the aircraft's actual altitude above the horizontal reference path, and summing means responsive to the actual altitude signal and the command signal for producing an altitude error signal representative of the algebraic difference between said signals; and wherein the utilization means is further responsive to the altitude error signal for control of the aircraft during its descent.

6. A control system according to claim 1 including means responsive to the position signal and command signal for producing a signal representative of the slope of each segmental descent path, and means responsive to the slope signal for producing a speed signal representative of the desired speed of the aircraft; and wherein the utilization means is further responsive to the speed signal for controlling the speed of the aircraft during its descent.

7. A control system according to claim 1 wherein the incremental advancements of the aircraft are position changes which are constant in magnitude along a straight line.

8. A control system according to claim 1 wherein each segmental descent path has a respective point of origin on the preceding descent path, said command signals being representative of the positions of consecutive points of origin which extend from the first linear descent path to the second linear descent path.

9. A control system according to claim 1 wherein the means for producing the position command signal includes a fourth signal source having an output representative of a series of reference points on the second descent path; means responsive to the output of the fourth signal source for producing a signal representative of the location of an initial linear transition path extending from the initial point of origin to an initial one of the reference points on the second descent path; and means responsive to the output of the fourth signal source for repeatedly producing signals representative of the respective locations of a series of successive linear transition paths each extending from a respective point of origin located on the preceding transition path to a respective reference point on the second descent path, the portion of each transition path between its respective points of origin defining said segmental linear descent path, the command signal being representative of the respective location of each point of origin.

10. A control system according to claim 9 including a fifth signal source representative of the position of a point in space; and wherein the first signal source is responsive to the output of the fifth signal source, whereby the incremental advancements of the aircraft are representative of the aircraft's actual horizontal distance from the point in space; and wherein the third signal source is responsive to the output of the fifth signal source, whereby the position command signal is representative of the aircraft's desired altitude relative to the point in space, the reference points being displaced from one another by a constant horizontal distance $\Delta X$ along a straight line, and the incremental advancements in the aircraft's actual horizontal displacement from the point in space being equal to the constant horizontal displacement $\Delta X$.

11. A control system according to claim 10 wherein the third signal source includes:
   a. a sixth signal source including means for producing a signal having a magnitude $\theta_0$ representative of the angle between the first linear descent path and the true horizontal;
   b. a seventh signal source including means for producing a signal having a magnitude $\theta_1$ representative of the angle between the second linear descent path and the true horizontal;
   c. an eighth signal source including means responsive to the output of the fifth signal source for producing a signal having a magnitude $X_0$ representative of the horizontal displacement of the point of intersection of the first and second descent paths from the point in space;
   d. a ninth signal source including means responsive to the output of the fifth signal source for producing a signal having a magnitude $h_0$ representative of the altitude of said point of intersection relative to the point in space;
   e. means for producing signals representative of the location of said initial linear transition path, said signal producing means including:
      1. a 10th signal source responsive to the sixth, eighth, and ninth signal sources for producing a signal having a magnitude $h_d$ determined in accordance with the relationship $h_d = (X - X_0) \tan\theta_0 + h_0$, where $X$ represents the aircraft's actual horizontal displacement from the point in space, $\tan\theta_0$ represents the tangent of the angle $\theta_0$, and $h_d$ represents the altitude of the initial point of origin relative to the point in space, the horizontal displacement of the initial point of origin relative to the point in space being the distance $X$;
      2. an 11th signal source responsive to the first and eighth signal sources for producing a signal having a magnitude $X_n$ determined in accordance with the relationship $X_n = X_0 - \Delta X$, where $X_n$ is the horizontal displacement of the initial reference point from the point in space; and
      3. a 12th signal source responsive to the first, seventh, and ninth signal sources for producing a signal having a magnitude $Y_n$ determined in accordance with the relationship $Y_n = h_0 - \Delta X \tan\theta_1$, where $\tan\theta_1$ is the tangent of the angle $\theta_1$, and $Y_n$ is the altitude of the initial reference point relative to the point in space; and
   f. means for producing signals representative of the respective locations of the series of successive linear transition paths, each successive transition path being determined when the aircraft's horizontal displacement $X$ from the point in space is $\Delta X$ less than the aircraft's horizontal displacement $X_{(pre)}$ from the point in space when the previous transition path was established, the signal producing means including:
      1. a 13th signal source responsive to the first, fifth, 10th, 11th, and 12th signal sources for producing a signal having a magnitude $m$ determined in accordance with the relationship
      $$m = \frac{h_d - Y_n}{X_{(pre)} - X_n},$$
      where $m$ represents the slope of each successive transition path;
      2. a 14th signal source responsive to the output of the first, fifth, 11th, and 12th signal sources previously established by the 13th signal source for producing a signal having a magnitude $h_d$ determined in accordance with the relationship $h_d = m(X - X_n) + Y_n$, where $h_d$ represents the altitude of the respective points of origin relative to the point in space;
      3. a 15th signal source responsive to the output of the first and fifth signal sources for producing a signal having a magnitude $X_n$ determined in accordance with the relationship $X_n = X_{n(pre)} - \Delta X$, where $X_{n(pre)}$ represents the horizontal displacement from the point in space of the respective reference point defining the previously established transition path, and $X_n$ represents the horizontal displacement from the point in space of the respective reference point defining the succeeding transition path; and
      4. a 16th signal source responsive to the output of the first, fifth, and seventh signal sources for producing a signal having a magnitude $Y_n$ determined in accordance with the relationship $Y_n = Y_{n(pre)} - \Delta X \tan\theta_1$, where $Y_{n(pre)}$ represents the altitude relative to the point in space of the respective reference point defining the previously established transition path, and $Y_n$ represents the altitude relative to the point in space of the respective reference point defining the succeeding transition path, said command signal being representative of the respective altitudes of each point of origin.

12. A control system according to claim 11 including a 17th signal source responsive to the output of the 13th signal source for producing a signal representative of the desired vector speed of the aircraft during its descent, the magnitude of said desired vector speed signal being inversely proportional to the magnitude of the slope of each respective transition path.

13. A control system according to claim 12 including means responsive to the output of the 17th signal source for producing a signal representative of desired horizontal speed.

14. A control system according to claim 12 including means for producing a signal representative of the aircraft's actual horizontal speed, and means responsive to the horizontal speed signal and the output of the 17th signal source for producing a signal representative of desired vertical speed.

15. A system for controlling the descent of an aircraft from a point of origin on a first substantially linear descent path to a second substantially linear descent path, each path having a different angle of descent, the control system comprising:
   a. means for producing position signals representative of incremental advancements in the aircraft's actual position as the aircraft descends from the point of origin toward the second path;
   b. means responsive to the position signals for producing a plurality of consecutive reference signals representative of successive aircraft angles of descent corresponding to the respective incremental advancements of the aircraft, the successive angles of descent progressively approaching the second path as the aircraft descends;
   c. means responsive to the reference signals for producing a plurality of consecutive position command signals representative of the positions of the successive angles of descent; and
   d. utilization means responsive to the command signals for control of the aircraft during its descent.

16. A control system according to claim 15 including means responsive to the reference signals for producing a plurality of consecutive signals representative of successive determinations of the aircraft's desired speed for the respective sensed incremental advancements of the aircraft.

17. A control system according to claim 15 wherein the position signals are produced in response to incremental advancements in the aircraft's actual horizontal displacement from the point of origin along a straight line.

18. A control system according to claim 15 wherein the successive position command signals define successive determinations of the aircraft's desired altitude.

19. A system for controlling the descent of an aircraft from an initial point of origin at a known position on a first substantially linear descent path to a second substantially linear descent path having a slope different from that of the first descent path so that the two descent paths define a point of intersection, the control system comprising:
  a. a first signal source including means for producing a signal representative of incremental advancements in the aircraft's actual position as it descends from the initial point of origin to the second descent path;
  b. a second signal source including means for producing a reference signal representative of successive spaced-apart reference points on the second descent path;
  c. a third signal source including means responsive to the output of the first and second signal sources for producing a signal representative of the position of an initial linear transition path extending from the initial point of origin to the reference point closest to the point of intersection;
  d. a fourth signal source including means responsive to the output of the first, second, and third signal sources for alternately first producing a position command signal representative of the positions of successive points of origin each on a respective preceding linear transition path, each point of origin being established at each incremental advancement of the aircraft, and then producing a signal representative of the positions of successive linear transition paths each extending from a respective point of origin on the preceding linear transition path to a respective reference point on the second descent path, the successive points of origin cooperating to define an approximation to a smoothly curved descent path extending from the initial point of origin to the second descent path; and
  e. utilization means responsive to the command signal for control of the aircraft during its descent.

20. The method of approximating a smoothly curved transition path along which a body moves, the transition path extending from an initial point of origin on a first substantially linear path to a second substantially linear path having a slope different from that of the first linear path, the initial point of origin having a known position relative to a point in space, the method comprising the steps of generating physical representations of a series of spaced-apart reference points on the second linear path; generating a physical representation of an initial linear transition path extending from the initial point of origin to an initial one of the reference points on the second linear path, alternately first generating physical representations of successive points of origin each on a respective preceding linear transition path and then generating physical representations of successive linear transition paths each extending from a respective point of origin on the preceding transition path to a succeeding reference point on the second linear path, the successive points of origin cooperating to define an approximation of a smoothly curved transition path extending from the initial point of origin to the second linear path, and moving the body along the smoothly curved transition path defined by the successive points of origin.

21. The method of approximating a smoothly curved transition path for the movement of an object, the transition path extending from an initial point of origin on a first substantially linear path to a second substantially linear path having a slope different from that of the first linear path and intersecting the first linear path at a point of intersection, the method comprising the steps of generating a first electrical signal representative of the location of the initial point of origin; generating a second electrical signal representative of the location of an initial reference point on the second linear path spaced from the point of intersection, the first and second electrical signals defining the location of an initial linear transition path extending from the initial point of origin to the initial reference point, alternately first generating a third electrical signal representative of the location of a succeeding point of origin on the preceding linear transition path and then generating a fourth electrical signal representative of the location of a succeeding reference point on the second linear path spaced farther from the point of intersection than the previous reference point, the successive pairs of third and fourth electrical signals defining the locations of successive linear transition paths each extending from a respective point of origin on the preceding transition path to a succeeding reference point on the second linear path, whereby the successive points of origin cooperate to define an approximation of a smoothly curved transition path extending from the initial point of origin to the second linear path, and controlling the movement of the object so the object follows the successive linear transition paths defined by the successive pairs of third and fourth electrical signals.

22. A method according to claim 21 including the step of generating an electrical signal representative of a finite distance $\Delta X$; and wherein the respective points of origin are displaced from one another by the distance $\Delta X$ along a straight line.

23. A method according to claim 21 including the step of generating an electrical signal representative of a finite distance $\Delta X$; and wherein the initial reference point is displaced from the point of intersection and the other reference points are displaced from one another by the distance $\Delta X$ along a straight line.

24. The method of approximating a smoothly curved transition path for the movement of an object, the transition path extending from an initial point of origin on a first substantially linear path to a second substantially linear path having a slope different from that of the first linear path so that the two paths define a point of intersection, the initial point of origin having a known position relative to a point in space, the method comprising the steps of generating a first series of signals representative of the locations of spaced-apart reference points on the second linear path; generating from the known position of the initial point of origin and from the first series of signals a second signal representative of the location of an initial linear transition path extending from the initial point of origin to the reference point closest to the point of intersection; generating from the second signal a third signal representative of the location of a second point of origin on the initial transition path displaced from the initial point of origin; generating from the third signal and from the series of first signals a fourth signal representative of the location of a linear transition path extending from the second point of origin to the reference point next closest to the point of intersection; repeatedly generating successive pairs of third and fourth signals representative of the locations of successive linear transition paths each extending from a respective second point of origin on the preceding transition path to a succeeding reference point until the locus of points of origin substantially coincides with the second linear path, and moving the object along the successive linear transition paths represented by the pairs of third and fourth signals.

25. A system for controlling the descent of an aircraft from an initial point of origin at a first known position on a first substantially linear descent path to a second substantially linear descent path having a slope different from that of the first descent path, the control system comprising means for producing a signal representative of incremental advancements in the aircraft's actual position as the aircraft descends from the initial point of origin to the second descent path; a source of indications of a horizontal reference path; means responsive to the position signal and the source of indications of the horizontal reference path for producing a command signal representative of the aircraft's desired position above the horizontal reference path, the command signal defining for the respective incremental advancements of the aircraft consecutive segmental linear descent paths extending from the initial point of origin to the second descent path such that the slopes of the respective segmental descent paths progressively approach the slope of the second descent path as the aircraft descends to define an approximation to a smoothly curved descent path extending from the initial point of origin to the second descent path; means responsive to the indications of the horizontal reference path for producing a signal representative of the aircraft's actual altitude above the horizontal reference path; summing means responsive to the actual altitude signal and the command signal for producing an altitude error signal representative of the algebraic difference between said signals; and utilization means responsive to the command signal and the altitude error signal for control of the aircraft during its descent.

* * * * *